(12) United States Patent
Best et al.

(10) Patent No.: US 6,548,097 B1
(45) Date of Patent: *Apr. 15, 2003

(54) FROZEN CONFECTIONS COMPRISING A GEL COMPOSITION

(75) Inventors: Eric Thomas Best, Dublin, OH (US); Harald Peter, Marysville, OH (US); Ronald P. Renati, Dublin, OH (US); Surintrspanont Singhachai, Dublin, OH (US)

(73) Assignee: Nestec S.A., Vevey (CH)

( * ) Notice: Subject to any disclaimer, the term of this patent is extended or adjusted under 35 U.S.C. 154(b) by 312 days.

This patent is subject to a terminal disclaimer.

(21) Appl. No.: 09/723,172

(22) Filed: Nov. 27, 2000

(51) Int. Cl.$^7$ ................................. A23G 9/00
(52) U.S. Cl. .................... 426/565; 426/91; 426/101; 426/104; 426/577
(58) Field of Search .............. 426/573, 68, 100, 426/101, 104, 577, 565

(56) References Cited

U.S. PATENT DOCUMENTS

| | | | |
|---|---|---|---|
| 2,059,541 A | 11/1936 | Thompson et al. | ........... 99/132 |
| 2,360,559 A | 10/1944 | Glazer | ........................ 99/136 |
| 2,701,767 A | 2/1955 | Twiege et al. | ................ 99/132 |
| 2,801,922 A | 8/1957 | Oprean | ........................ 99/137 |
| 2,910,365 A | 10/1959 | Olliver | ........................ 99/132 |
| 3,367,784 A | 2/1968 | Waitman et al. | ............... 99/132 |
| 4,190,676 A | 2/1980 | Goringer et al. | ............. 426/100 |
| 4,268,533 A | 5/1981 | Williams et al. | ............. 426/577 |
| 4,826,656 A * | 5/1989 | Huber et al. | ................. 426/565 |
| 5,019,414 A * | 5/1991 | Valdes | ......................... 426/573 |
| 5,246,725 A * | 9/1993 | Fisher et al. | ................. 426/565 |
| 5,478,587 A * | 12/1995 | Mingione | .................... 426/565 |
| 5,502,181 A * | 3/1996 | Kojima et al. | ............ 536/123.1 |
| 5,605,712 A * | 2/1997 | Bertrand et al. | ............. 426/565 |
| 6,379,724 B1 * | 4/2002 | Best et al. | ..................... 426/68 |
| 6,399,134 B1 * | 6/2002 | Best et al. | ................... 426/565 |

FOREIGN PATENT DOCUMENTS

| | | | |
|---|---|---|---|
| FR | 2 387 605 | | 11/1978 |
| WO | WO 02/071856 | * | 9/2002 |
| WO | WO 02/071862 | * | 9/2002 |

* cited by examiner

Primary Examiner—Nina Bhat
(74) Attorney, Agent, or Firm—Winston & Strawn

(57) ABSTRACT

A frozen dessert product that includes as gel providing ingredients an anionic gelling hydrocolloid and a gelation controller or inhibitor, the ingredients providing or forming a gel having a hardness of between about 25 and 150 g and an adhesiveness of less than 5 g.s. Also, composite frozen confections containing such a gel and methods for making the gel and products containing the gel.

17 Claims, No Drawings

FROZEN CONFECTIONS COMPRISING A GEL COMPOSITION

TECHNICAL FIELD

The present invention relates to gels and their use in frozen confections. In particular the invention relates to gels made with poly-anionic gelling hydrocolloids, because such materials give pleasing textures with visual clarity, wobble, strength, minimal adhesiveness as well as good flavor release and mouthfeel.

BACKGROUND OF THE INVENTION

Hydrocolloidal gels for use in food products may be prepared by a variety of methods and from a variety of materials. In order for controlled dosing and shaping of these materials, such techniques normally require an initial preparation of a fluid hydrocolloid solution called a sol that has to be heated, maintained hot and then hot-filled into molds.

Typically, the sol will degrade if held hot for any significant period of time. Such degradation leads to losses of gel strength in the ultimate gel and to the introduction of increasing degrees of adverse adhesiveness in the final product. Yet, if allowed to cool, such a sol will set, with adverse effects both to production handling and to finished product quality.

Others have suggested alternative materials to avoid this problem.

JP 2000 004793 relates to an iced dessert with a jelly-like solid item coated with ice cream. This product is jelly-like, not a true gel and is produced by insoluble dietary fiber such as sweet potato fiber.

JP 1118789 relates to a frozen dessert containing sugar alcohols and curdlan. Curdlan is not a polyanionic hydrocolloid. Curdlan is a non-ionic polysaccharide derived from the microbe called *A. faecalis* and has a linear beta 1–3 glucose backbone. Curdlan is not an approved food material in USA or Europe and the conditions under which it forms its gel are not those used in many of the processes of the food industry. Curdlan is insoluble in cold water and undergoes hydration and subsequent gelation upon heating at above 80° C.

JP 2000 50802 relates to the formation of a ring design using two fluid ingredients of different color. Similarly, JP 1999 346659 relates to a swirl design food based upon molding and nozzle devices. These references do not relate to a gel or to a method of making a gel.

JP 1973 20313 relates to the use of alginates as ingredients within shape retaining ice cream. After thawing, the alginates absorb the water that is released from the melting ice. This does not relate to a separate gel, or to a method of making a separate gel, although it is acknowledged that the thawed ice cream does itself have some gel character.

DDR 1978 0152 582 relates to the process of utilizing enzymes to create hydrolysed maize starch that in a heated aqueous suspension forms a dextrinaceous mass (15 dextrose equivalent or DE) that gels upon cooling. The process requires a temperature of 95–100° C. in order to inactivate the enzyme. Such temperatures have been found to be antagonistic to polyanionic hydrocolloids in the absence of a gel inhibitor.

U.S. Pat. No. 4,985,263 discloses a method for coating a frozen confection product containing calcium ions by dipping the frozen confection into a flowable aqueous medium containing an alkali metal alginate to form a coating thereon and spraying the coated product with an aqueous solution of a calcium salt. It is believed that the calcium in the frozen confection reacts with the alcali metal alginate in the flowable aqueous medium to form a gel on the surface of the frozen confection and that the calcium salt in the spray reacts with the alcali metal alginate in the coating to form a gel on the outside surface of the frozen confection.

For the purposes of food preparation for manufactured frozen desserts, the components are first pasteurized and then held at temperatures close to 4° C. until utilized in the shaping/forming processes, and then the product is frozen. In such a production process, even with all due diligence paid to forward planning, it is typical that the pasteurized part-processed material may need to be kept for periods in excess of 24 h. It is for proper microbiological and hygiene reasons, i.e., to avoid spoilage, that such storage is typically held under cold conditions, e.g., about 4° C.

In order to utilize conventional frozen confection molded lines, a product with novel eating qualities of a frozen gel that has not been overheated. Accordingly, there is a need for hydrocolloidal gels that do not undergo hot-storing and hot-filling. In terms of process efficiency and possible damages to molds, particularly welded molds, it is desirable to limit or even avoid very hot filling, e.g., at temperatures in excess of about 50° C. In addition, holding the sol at cold post pasteurization conditions permits certain simple energy savings. This is because the pasteurizer exit heat can then be withdrawn from the product in a regeneration heat exchanger thus warming up the pasteurizer product feed.

The present invention now provides a novel gelling system that overcomes the shortcomings of the prior art.

SUMMARY OF THE INVENTION

The invention relates to a frozen dessert product comprising as gel providing ingredients an anionic gelling hydrocolloid and a gelation controller or inhibitor. These ingredients provide or form a gel having a hardness of between about 25 and 150 g and an adhesiveness of less than 5 g.s.

The invention also relates to a method that can be utilized to prepare such food products without causing inherent changes in ultimate gel nature or loss of gel character. This method involves the steps of preparing a liquid sol that contains a gel forming mixture of an anionic gelling hydrocolloid together with a gel controller or inhibitor, adding the mixture to at least a portion of a formulation that is to be used to prepare the food product, and neutralizing the gel controller or inhibitor immediately before shaping, forming or packaging of the product in order to provide a food product that contains a gel therein.

Other novel products and methods of manufacture are disclosed herein. For example, a composite frozen confection comprising multiple components can be made wherein at least one of the components includes the gel providing ingredients described herein. Also, in another method, a composite frozen confection is prepared by making two mixes, one with an anionic gelling hydrocolloid and the other with a water ice and a setting salt, cold blending the two mixes, filling the blended mixes into molds, quiescently freezing the molds, inserting sticks into the blended mixes before completion of the freezing step, and demolding and packaging of the products thus produced. Alternatively, a composite frozen confection can be prepared by filling molds with a water ice mix, forming a frozen layer on the side wall of the molds, removing any remaining liquid contents from the molds, filling empty spaces in the molds with heated gel in order to produce a shell and core split, quiescently freezing the molds, inserting sticks into the cores before completion of the freezing step, and demolding and packaging of the products thus produced.

DETAILED DESCRIPTION OF THE PREFERRED EMBODIMENTS

There are 4 main problems that are solved with the products and methods of the invention. These problems are as follows:

1. The hydrocolloid degradation that results from hot storage leads to weakening of the products. As the sol's time duration during hot storage is not precise, this results in products that have variable textural properties. Such variable characteristics lead to products that are inconsistent in process handling characteristics. This leads to excessive product rejection and also to line blockages. Very importantly, it also leads to products that are inconsistent for the consumer. Such inconsistencies may present themselves to a varying degree, product by product and batch by batch. Softness of texture will lead to shape losses, and these may occur rapidly during the warming up that occurs to the product during the times period of consumption.

These variations cannot be overcome by simply increasing the hydrocolloid concentration. Alternatively, hardness of texture (a result of using excess hydrocolloid to overcome thermal degradation) will lead to losses of wobble, poor flavor release and unpleasant rubberiness. It is essential to achieve a gel character that is of consistent hardness.

2. Thermal degradation leads to a greater proportion of products that completely fail to gel. Products that do not gel fail to deliver the desired textural characteristics to the consumer. They are more susceptibly to falling apart and if a stick product may readily disengage from the stick. They melt leading to excess dripping. They fail to control ice crystal growth leading to products that suffer heat shock damage in distribution systems. They fail to control flavor release leading to excessive and unbalanced initial impact, followed by flavor fade leading to the presence of an unflavored mass in the mouth.

3. Thermal degradation of hydrocolloid sols leads to the creation of adhesiveness. Such stickiness or gumminess renders such products difficult to handle in production in operations such as de-molding, lifting off conveyor belts, during wrapping operations etc. From the product point of view, products become difficult to unwrap, and stick to the teeth during eating. Excessive thermal breakdown of sols can even lead to sliminess as well as adhesiveness.

4. The forth issue involves colder storage of the sol. Cold storage of sols prior to the shaping and freezing process leads initially to excess viscosities developing. This slows down material transfer operations by increasing backpressure, sometimes leading to seal failure. Also it leads to issues with starvation of the feed sections of pumps. The initiation of gelling leads to the formation of skins on top of stored sols; these become rings of debris on vessel walls. This results in material losses and, when particles break off, it leads to partial blockages of screens etc. Rather quickly, full gelation results, leading to the requirement to dig out process vessels, dismantle pipes and pumps etc. Gelation that occurs prior to product shaping, pre-gelation, will lead to the presence of shear-damaged gels. Such damaged gels will not re-heal and will result in a consumer perception of frozen slush rather than a jelly dessert.

The invention provides combinations of polyanionic gelling hydrocolloids, preferably e.g., carrageenan plus pectin, because the rheological properties of binary hydrocolloid mixtures are related to the microstructure.

The products contemplated by the invention comprise in particular frozen jellies or combinations of ice cream and water ice with jellies that are:

Jelly products of highly consistent and controllable gel strength—in excess of 25 g.

Jelly products of relatively low adhesiveness—less than 5 g.s.

Products that are consistent in gel character, being neither too soft nor too hard.

Products that have controlled adhesiveness in the gel aspect.

Products that may be made in a typical ice cream factory using existing equipment assets.

Unique products that could not be made previously.

Preferred products comprise simple single gelling hydrocolloid jellies that may be formed by molding, layering, rope formation, enrobing, dipping, lamination, co-extrusion, or any of hosts of other shaping possibilities.

The gels may themselves be combinations of hydrocolloids exhibiting synergistic benefits or having unique textural characteristics. Similarly, two or more phase "gel in gel" emulsions may be prepared.

Other polyanionic gelling hydrocolloids can be used and would include most marine or seaweed extracts, e.g. agar, alginate, furcelleran etc., and certain of the microbial polysaccharides, e.g. gellan, xanthan, succinoglycan etc. Some other hydrocolloids such as carboxymethylcellulose (CMC) could be captured under the term polyanionic hydrocolloids, but these would not be captured under the name polyanionic gelling hydrocolloids and are therefore not contemplated in the invention.

In addition to the polyanionic hydrocolloids, other hydrocolloids may be beneficially included in the formulations.

Neutral hydrocolloids that do not typically gel on their own are included in the worked examples. This because a synergism is observed for mixtures of locust bean gum (LBG) and polyanionic hydrocolloids, which shows a strong dependence upon the ionic environment.

Further LBG is not observed to increase the "solidity" or G prime, under ionic conditions of excess sodium cations. In fact in such conditions, LBG hinders natural self-association of the polyanionic gelling hydrocolloids by influencing the supermolecular structure.

Similar neutral hydrocolloids would include all the uncharged seed gums, particularly the galactomannans, certain extrudate gums, and even some root cell polysaccharides such as Konjac.

The levels of hydrocolloids used would depend on the finished products characteristics, on the process handling characteristics such as e.g., viscosity, set temperature, set rate etc. They should be compatible the ones with the others.

A gelation controller or inhibitor that would satisfy the needs in the context of the invention is any alkaline salt that contains a monovalent cation with an atomic number of less than 15, and also an anion that is a chellating species.

This practically includes as a cationic species the sodium, ammonium and lithium ones and excludes divalent cations such as magnesium and calcium as well as hydrogen ions.

As an anionic species all chelating elements such as organic acid salts, in particular citrates, and all types of phosphates including hexametaphosphates are suitable, but to the exclusion of hydroxides.

Thus inhibition of gelation is done by a special food-grade buffer. The gelation inhibitor has a natural pH of around 11 to increase electronegativity of the system. It has the property of chelating cations and exerts a buffer effect, such that natural periodic variability in pH of the system is minimized, despite slight variabilities of other ingredients in their own acidity or alkalinity.

The appropriate dose of this material can be established for a variety of the negatively charged polymer hydrocolloid system. The preferred range is between about 0.1 to 0.4% by weight of the sol composition, and it is most preferably about 0.2%.

All such salts should obviously be food grade and soluble in the range of about 0 to 10° C., and preferrably at about 4° C.

All such gelation inhibiting or controlling salts can also be prepared in situ from precursors that are not themselves such salts, but which react to create salts during the processing stages.

The most preferred gelation inhibitor salt is trisodium phosphate.

In the method of the invention, having deliberately inhibited gelation to permit easy processing, the neutralization of the gel inhibitor mechanism takes place. Obviously, the inhibiting influence must be removed at the point of depositing or otherwise handling the jelly shortly, and preferably immediately before freezing. This is currently achieved by using a special system comprising a setting salt or preferably a mixture of color, flavor, acid and setting salt.

The final system may consist of as much as about 98% of the hydrocolloid base and as little as about 2% of the setting salt or mixture. Addition of the setting salt or mixture neutralizes the alkalinity and swamps the chelating power of the prior modification. The sol, which is a liquid unset jelly, therefore rapidly becomes a gel.

Prior to adding the setting salt or mixture, the sol may be re-heated although this is not preferred. A limited re-heating delays premature gelation during addition of setting salt or mixture. Rapidly re-heating to up to about 50° C. makes the blending in of the setting salt or mixture before deposit possible. In this context, a slight degree of pre-gelation is acceptable, or even desirable in some circumstances, provided it is controlled. Thus by coloring the setting salt or mixture and the sol differently, unique color combinations are possible and by having portions of the mixture at different gel strengths, may be some as water ice, then the flavor release characters can be given different dimensions.

Also shear rate and shear time play a role in the result. Insufficient shear rate results in inadequate blending of the sol and the setting salt or mixture before the gelation reaction starts. A high shear rate may be applied immediately before, and during, blending as an alternative to higher temperature. A dispenser at mid-speed range of about 4,000 rpm or a static mixer are appropriate for in-line mixing. The time of mixing required is entirely related to the viscosities of the components, their composition, the speed of agitation, the rate of building up of viscosity, the gelation time etc. A few seconds is usually sufficient.

The gels may be part components of two phase or multi-phase combination products. Other phases may include other gels, fluid masses, gases, and solids such as lipid components or inclusions or others.

EXAMPLES

The invention is further illustrated by reference to the following Examples describing in detail the methods of the present invention. The examples are representative and should not be construed to limit the scope of the invention in any way. In the following Examples, parts and percentages are by weight unless stated otherwise. In the Examples, gel strength and adhesiveness were determined as indicated below.

Gel Strength/Adhesiveness Measurements

Gel properties were determined using a TAXT/2 texture analyzer on samples allowed to thaw.

Testing was conducted when the surface temperature of the samples was at 25° C. by infrared thermometer.

Product perception is in the mouth, which although initially at close to 37° C., gets cooled by the consumption of the frozen dessert. It was not deemed relevant to test the product when it was completely frozen.

A TA-18 probe, which is a half-inch diameter stainless steel ball, was used in texture profile analysis mode. The probe is attached to a bi-directional load cell.

The probe was programmed to penetrate the sample to a depth of 1 mm. A speed of 2 mm/s on the "bite" was utilized.

The results were represented in a force time curve.

Hardness is represented as the maximum force in grams during penetration and this point occurred at the maximum penetration distance.

Adhesiveness is represented as the negative area of the force-time curve (g.s) during the ascent of the probe. In other words it is the pull on the probe as it lifts off the sample.

Example 1

Carrageenan System a) A sol was prepared from the ingredients indicated in Table 1 below by using the method of preparation indicated below.

TABLE 1

| Ingredient | Parts |
| --- | --- |
| Water | 61.76 |
| Sucrose | 15.00 |
| Corn Syrup, 36 DE, 80% solids | 20.00 |
| Carrageenan (kappa) | 0.35 |
| Locust bean gum | 0.20 |
| Trisodium phosphate | 0.20 | b) A gel was prepared from the sol formula with additional ingredients as indicated in Table 2 below by using the method of preparation indicated below.

TABLE 2

| Ingredient | Parts |
| --- | --- |
| Sol | 97.51 |
| Citric acid solution, 50% solids | 1.10 |
| Potassium chloride solution, 10% solids | 1.00 |
| Flavor | 0.20 |
| Color solution | 0.19 | c) Method of preparation
1. The water was heated to 60° C. and agitated at high shear (4,000 rpm by Silverson dispersator or equivalent) and the trisodium phosphate incorporated.
2. The hydrocolloid (carrageenan) was added in a slow stream (to avoid clumps) to the side wall of the vortex. Agitation was maintained until solution was confirmed (lack of visible solid particles adhering to an inserted rod).
3. The sucrose and corn syrup were then incorporated.
4. The sol was then pasteurized at 85° C. on an HTST (high temperature short time) plant.
5. The sol was cooled down to 4° C. and stored in tanks under slow agitation.
6. Within 10 minutes of the product forming/shaping operation and preferably immediately prior to it, the sol was heated up to 50° C. and the remaining ingredients for the gel were incorporated by an in-line mixer or equivalent equipment.

Mixing time, in general, depends upon the mixer speed and the product viscosity. Mixing time should be minimized to that required for obtaining uniformity in the product. This time may be established by observing the distribution of the color added to the sol during the operation. Excess mixing times, such as might result from too slow stirring, should be avoided, as in such a case shear damage to a forming gel might result.

7. The sol was shaped as desired, which may be in combination with other materials, it was cooled to set, frozen, wrapped and kept in cold storage until sale.

In this Example, the product's gel was found to have a hardness of 57 g and an adhesiveness of 0.1 g.s.

Example 2

Kappa Carrageenan System

Product was prepared as in Example 1 except that the sol's holding time at 4° C. was varied to establish the effect upon the final gel properties. The results are indicated in Table 3 below.

TABLE 3

| Time of Sol at 4° C. (h) | Gel Strength of final Product (g) |
| --- | --- |
| 0 | 57.2 |
| 24 | 56.8 |
| 48 | 56.7 |
| 72 | 56.8 |

This was supported by no observable change in the product's adhesiveness value which maintained 0.1 g.s.

This Example demonstrates that holding the sol for extended periods of time does not adversely influence the final gel properties. Similarly, it demonstrates that the characteristics of the products were consistently reproduced.

Example 3

Kappa Carrageenan/Pectin System

A sol was prepared from the ingredients indicated in Table 4 below by using the method of preparation indicated in Example 1. A gel was then prepared as in Example 1.

TABLE 4

| Ingredient | Parts |
| --- | --- |
| Water | 61.41 |
| Sucrose | 15.00 |
| Corn Syrup, 36 DE, 80% solids | 20.00 |
| Carrageenan (kappa) | 0.20 |
| Locust bean gum | 0.20 |
| Pectin, 35 DM | 0.50 |
| Trisodium phosphate | 0.20 |

This Example is illustrative of the use of multiple gelling hydrocolloids in combination.

Example 4

Kappa Carrageenan/Pectin System

Product was prepared as in Example 3 except that the sol's holding time at 4° C. was varied to establish the effect upon the final gel properties. The results are indicated in Table 5 below.

TABLE 5

| Time of Sol at 4° C. (h) | Gel Strength of final Product (g) |
| --- | --- |
| 0 | 43.8 |
| 24 | 43.8 |
| 48 | 46.8 |
| 72 | 43.3 |

This was supported by no observable change in the product's adhesiveness value which maintained 0.2 g.s.

This Example demonstrates that holding the sol for extended periods of time does not adversely influence the final gel properties. Similarly, it demonstrates that the characteristics of the products were consistently reproduced.

Comparative Examples

Comparative Example 1

Without the Gel Controller/inhibitor

Product was prepared using the recipe of Example 1, except without the presence of the trisodium phosphate.

The sol converted to a gel upon cooling. Gelation started to occur at a temperature of 38–40° C.

This Example confirmed the role of the gel controller/inhibitor.

Comparative Example 2

Holding the Sol at Elevated Temperatures

Product was prepared as in comparative Example 1, except that the sol was held liquid by maintaining at a temperature of 50° C.

The holding time of the sol at 50° C. was varied to establish the effect upon the final gel properties. The results of gel strength and adhesiveness are indicated in Tables 6 and 7 below.

TABLE 6

| Time of Sol at 50° C. (h) | Gel Strength of final Product (g) |
| --- | --- |
| 0 | 56.3 |
| 1 | 43.8 |
| 5 | 21.2 |
| 10 | 6.3 |
| 15 | Liquid |

TABLE 7

| Time of Sol at 50° C. (h) | Adhesiveness of Final Product (g.s) |
| --- | --- |
| 0 | 0.1 |
| 1 | 1.8 |
| 5 | 9.8 |
| 10 | 15.6 |
| 15 | Liquid |

This Example confirms that holding the sol at elevated temperature results in changed characteristics to the final gel formed, according to the time at the elevated temperature.

Comparative Example 3

Holding the Sol at Elevated Temperatures and Increasing the Level of Anionic Hydrocolloid (Attempting to Compensate for a Degree of Thermal Degradation).

A product was prepared as in comparative Example 1, except that the carrageenan in the sol was increased to 0.6%

(the increase of 0.25 parts of carrageenan was compensated by reducing the water in the recipe by the same 0.25 parts). Owing to high viscosity constraints, this sol had to be held at 60° C.

With product produced from sol that had been held for 2 h at this temperature, the gel strength had already fallen to only 15% of that of product made from freshly prepared sol. Product produced from sol that had been held for 16 hours at this temperature failed to gel and remained as a sticky liquid.

Example 5

Ice Cream Bar Coated with Gel

A sol was prepared as in Example 1 and stored in a stirred tank at 4–10° C. Just before use, the sol was heated to about 50° C. in a heat exchanger and the necessary quantity of a solution containing color, flavor, acid and setting salt as in Example 1 was dosed in the line and mixed with the sol by a static mixer and the resulting mixture stored in a stirred tempering tank at 50° C., pending use for gel coating. The tempering tank was connected to a gel coating tank maintained at 50° C. through an inlet pipe and the overflow was returned to the tempering tank through a heated outlet pipe.

A stick ice cream bar with 100% overrun was produced by extrusion and it form fixed in a freezing tunnel. It was then surface-cooled in a nitrogen bath for 2–5 s, its surface temperature being –25° C.

The surface-cooled bar was then dipped into the gel coating tank during about 50 s and then hardened 10–20 s in liquid nitrogen, flow-packed and stored at –30° C.

Example 6

Water Ice Shell Stick Bar with Gel Center

A sol was prepared as in Example 1 and stored in a stirred tank at 4–10° C. Just before use, the sol was heated to about 50° C. in a heat exchanger and the necessary quantity of a solution containing color, flavor, acid and setting salt as in Example 1 was dosed in the line and mixed with the sol by a static mixer and the resulting mixture led to a heated gel dosing unit warmed at 50° C. for immediate use for filling at 40–50° C.

Using a mold line, provided successively with a standard water ice hopper, a suction device and the heated gel dosing unit, molds travelling through a refrigerated brine bath were filled with water ice and, when a frozen layer of about 2 mm thickness was achieved on the side wall of the molds, the liquid contents from the centers of the molds were sucked out. The empty spaces in the molds were then filled with the heated gel in order to produce a shell and core split. The products were quiescently frozen, sticks were inserted, the stick bars demolded by surface-heating, surface-hardened, wrapped and stored at –30° C.

Example 7

Twisted Composite Water Ice Stick Bar with Gel

A composite water ice and gel stick bar was produced as in Example 6 from colored water ice and gel. In so doing a mold in the mold two steps molding process was used with a mold for the core of helicoidal shape for producing the core in the first step and an external mold of frustoconical shape for the gel. The resulting stick bars were in the shape of a contrasted colored double helix.

Using the double mold line, provided successively with a standard water ice hopper and the heated gel dosing unit, a first series of helical molds for the core and a second series of frustoconical molds for the complement were travelling through brine baths. After filling the first series of molds with water ice, the cores were quiescently frozen, stick were inserted, the sticked centers were demolded by surface-heating of the first molds and the cores were placed into the second series of molds which were partly filled with heated gel. In doing so, the liquid gel filled the empty spaces of the second molds and the whole was quiescently frozen. After demolding by heating the surface of the second molds, the products were surface-hardened, wrapped and stored at –30° C.

Example 8

Blended Composite Water Ice Stick Bar with Gel

A sol was prepared as in Example 1 and stored in a stirred tank at 4–10° C.

A colored water ice mix was separately mixed in a stirred tank at 4–10° C. with the necessary quantity of a setting salt.

The sol and the water ice with setting salt of contrasted colors were dosed from positive displacement hoppers in the line and blended by a static mixer and the resulting mixture led to a cold gel dosing unit for filling molds travelling through a refrigerated brine bath. The proportions of gel/water ice mix were 50/50 to 70/30.

Sticks were inserted, the products quiescently frozen, demolded by heating the surface of the molds, surface-hardened, wrapped and stored at –30° C.

The composite stick bars so produced had a new contrasting aspect and a new contrasted texture of ice and gel.

What is claimed is:

1. A frozen dessert product comprising as gel providing ingredients an anionic gelling hydrocolloid and a gelation controller or inhibitor, the ingredients providing or forming a gel having a hardness of between about 25 and 150 g and an adhesiveness of less than 5 g.s.

2. A product according to claim 1, wherein the hardness is between about 35 and 100 g and an adhesiveness of less than 3 g.s.

3. A product according to claim 1 wherein the gel controller or inhibitor is trisodium phosphate.

4. A composite frozen confection comprising multiple components, wherein at least one of the components includes as gel providing ingredients an anionic gelling hydrocolloid and a gelation controller or inhibitor, the ingredients providing or forming a gel having a hardness of between about 25 and 150 g and an adhesiveness of less than 5 g.s.

5. A composite frozen confection according to claim 4, wherein a first component is a shell or a coating and a second component is a core.

6. A composite frozen confection according to claim 4, wherein the first component is a coating and includes the gel.

7. A composite frozen confection according to claim 4, wherein second component is a core includes the gel.

8. A composite frozen confection according to claim 4 in the form of a stick bar.

9. A composite frozen confection according to claim 4, wherein the first component has a different color from that of the second component.

10. A method for preparing a food product that contains a gel which comprises preparing a liquid sol that contains a gel forming mixture of an anionic gelling hydrocolloid together with a gel controller or inhibitor, adding the mixture to at least a portion of a formulation that is to be used to prepare a food product, and neutralizing the gel controller or inhibitor immediately before shaping, forming or packaging of the product in order to provide a food product that contains a gel therein.

11. A method according to claim 10, in which the gel controller or inhibitor is trisodium phosphate.

12. A method according to claim 10, in which the product is formed by hot-filling the formulation and gel forming mixture into molds followed by quiescently freezing the molds.

13. A method according to claim 12, in which a stick is inserted into each mold prior to completion of the freezing step.

14. A method according to claim 10, in which the gel that is formed has a hardness of between about 25 and 150 g and an adhesiveness of less than 5 g.s.

15. A method for preparing a composite frozen confection, which comprises making two mixes, of which one is a gel forming mixture according to the method of claim 10 and the other with a water ice and a setting salt, cold blending the two mixes, filling the blended mixes into molds, quiescently freezing the molds, inserting sticks into the blended mixes before completion of the freezing step, and demolding and packaging of the products thus produced.

16. A method for preparing a composite frozen confection, which comprises making two mixes, one with an anionic gelling hydrocolloid and the other with a water ice and a setting salt, cold blending the two mixes, filling the blended mixes into molds, quiescently freezing the molds, inserting sticks into the blended mixes before completion of the freezing step, and demolding and packaging of the products thus produced.

17. A method for preparing a composite frozen confection, which comprises filling molds with a water ice mix, forming a frozen layer on the side wall of the molds, removing any remaining liquid contents from the molds, filling empty spaces in the molds with heated gel in order to produce a shell and core split, quiescently freezing the molds, inserting sticks into the cores before completion of the freezing step, and demolding and packaging of the products thus produced.

* * * * *

UNITED STATES PATENT AND TRADEMARK OFFICE
CERTIFICATE OF CORRECTION

PATENT NO.    : 6,548,097 B1
DATED         : April 15, 2003
INVENTOR(S)   : Best et al.

It is certified that error appears in the above-identified patent and that said Letters Patent is hereby corrected as shown below:

<u>Title page,</u>
Item [75], Inventors, change "Surintrspanont Singhachai" to -- Singhachai Surintrspanont --.

Signed and Sealed this

Thirtieth Day of March, 2004

JON W. DUDAS
*Acting Director of the United States Patent and Trademark Office*